US012770197B2

(12) United States Patent
Herman et al.

(10) Patent No.: US 12,770,197 B2
(45) Date of Patent: Oct. 20, 2026

(54) AUTOMATIC DATA COLLECTION OF HIGH-FIDELITY VEHICLE DATA FOR USAGE BASED INSURANCE

(71) Applicant: Ford Global Technologies, LLC, Dearborn, MI (US)

(72) Inventors: David Michael Herman, West Bloomfield, MI (US); Anuj Pal, St Paul, MN (US)

(73) Assignee: Ford Global Technologies, LLC, Dearborn, MI (US)

( * ) Notice: Subject to any disclaimer, the term of this patent is extended or adjusted under 35 U.S.C. 154(b) by 27 days.

(21) Appl. No.: 18/810,791

(22) Filed: Aug. 21, 2024

(65) Prior Publication Data

US 2026/0057451 A1 Feb. 26, 2026

(51) Int. Cl.
*G06Q 40/08* (2012.01)

(52) U.S. Cl.
CPC .................................... *G06Q 40/08* (2013.01)

(58) Field of Classification Search
CPC ....... G06Q 40/08; G06Q 40/082; G06Q 40/09
USPC .............................................................. 705/4
See application file for complete search history.

(56) References Cited

U.S. PATENT DOCUMENTS 10,817,950 B1 * 10/2020 Iqbal ........................ G07C 5/02
10,825,095 B1 11/2020 Bernico et al.
11,367,142 B1 6/2022 Wang et al.
11,373,249 B1 6/2022 Hayward et al.
11,393,039 B2 7/2022 Khalak et al.
11,443,360 B2 9/2022 Walters et al.
12,002,305 B1 6/2024 Gross et al.
2015/0294422 A1 * 10/2015 Carver .................. G06Q 40/08 705/4
2019/0188212 A1 6/2019 Miller et al.
(Continued)

FOREIGN PATENT DOCUMENTS

CN 114722945 A 7/2022

OTHER PUBLICATIONS

Vernade, “Bandit Learning with Delays in Non-Stationary Environments”, https://www.youtube.com/watch?v=NyqalkZUfjs, Cluster of Excellence: Machine Learning: New Perspectives for Science, Oct. 18, 2021.

(Continued)

*Primary Examiner* — Cho Yiu Kwong
(74) *Attorney, Agent, or Firm* — Joseph Zane; Brooks Kushman P.C.

(57) ABSTRACT

Assessing driver risk for usage-based insurance (UBI) is provided. Risk metrics are sent, to a plurality of vehicles from a cloud server, defining indications of driving events that may occur on the vehicles that are indicative of an effect on UBI rates for the vehicles. The cloud server receives, from the vehicles, aggregated data points collected by the vehicles use in determining UBI rate and high-fidelity data points collected by the vehicles responsive to occurrence of the driving events. The high-fidelity data points are analyzed using a vehicle data service to determine updated risk metrics using a multi-arm bandit approach with delayed feedback based on a risk model and claim data indicative of actual claims made with respect to the plurality of vehicles. The updated risk metrics are provided to the plurality of vehicles to aid in detection of the driving events that affect the UBI rates.

17 Claims, 5 Drawing Sheets

(56) References Cited

U.S. PATENT DOCUMENTS

| | | | | |
|---|---|---|---|---|
| 2019/0333636 | A1 | 10/2019 | Bennett et al. | |
| 2021/0256616 | A1* | 8/2021 | Hayward | G06Q 40/08 |
| 2022/0036194 | A1 | 2/2022 | Sundaresan et al. | |
| 2022/0036466 | A1 | 2/2022 | Harvey et al. | |
| 2023/0300579 | A1 | 9/2023 | Merwaday et al. | |
| 2024/0043025 | A1 | 2/2024 | Di Lillo et al. | |
| 2024/0119535 | A1 | 4/2024 | Kloeppel et al. | |

OTHER PUBLICATIONS

Grover et al., "Best Arm Identification in Multi-Armed Bandits with Delayed Feedback", Proceedings of the 21st International Conference on Artificial Intelligence and Statistics (AISTATS), 2018, 10 pages.
Nesterov, Lectures on Convex Optimization, 2 Ed., Springer, 2018, pg. xii (Year: 2018).
Mahajan, Aditya et al. "Multi-Armed Bandit Problems". Foundations and Applications of Sensor Management. 70 pages.
Slivkins, Aleksandrs. "Introduction to Multi-Armed Bandits". Microsoft Research NYC. Apr. 2024. 188 pages.
De Freitas, Nando. "CPSC540 Bayesian optimization bandits and Thompson sampling". UBS Feb. 2013. 31 pages.
Bouneffouf, Djallel et al. "A Survey on Practical Applications of Multi-Armed and Contextual Bandits". IBM Thomas J. Watson Research Center, Yorktown Heights, NY USA. Apr. 2, 2019. 8 pages.
De Freitas Nando, "Machine learning—Bayesian optimization and multi-armed bandits", https://www.youtube.com/watch?v=vz3D36VXefl, Feb. 12, 2013.

* cited by examiner

AUTOMATIC DATA COLLECTION OF HIGH-FIDELITY VEHICLE DATA FOR USAGE BASED INSURANCE

TECHNICAL FIELD

Aspects of the disclosure generally relate to automatic data collection of high-fidelity vehicle data to develop usage-based insurance (UBI).

BACKGROUND

Connected vehicles may send data to a cloud system. As the cloud system receives thousands of messages from millions of vehicles, this quantity of data may become large.

UBI is a type of vehicle insurance whereby the premium cost is dependent on the driving behavior of a driver. A UBI device may be connected to a vehicle network via a connector such as an on-board diagnostic II (OBD-II) port to collect vehicle operating data and send the data to a remote server for analysis. In other examples, a telematics control unit (TCU) of the vehicle may collect the vehicle operating data and send the data to the remote server for analysis.

SUMMARY

In one or more illustrative examples, a method for assessing driver risk for usage-based insurance (UBI) includes sending, to a plurality of vehicles from a cloud server, risk metrics defining indications of driving events that may occur on the vehicles that are indicative of an effect on UBI rates for the vehicles; receiving, to the cloud server from the plurality of vehicles, aggregated data points collected by the vehicles use in determining UBI rates; receiving, to the cloud server from the plurality of vehicles, high-fidelity data points collected by the vehicles responsive to occurrence of the driving events; analyzing the high-fidelity data points by the cloud server using a vehicle data service to determine updated risk metrics; and providing the updated risk metrics to the plurality of vehicles to aid in detection of the driving events that affect the UBI rates.

In one or more illustrative examples, to determine the updated risk metrics includes using a multi-arm bandit approach with delayed feedback based on a risk model and claim data indicative of actual claims made with respect to the plurality of vehicles.

In one or more illustrative examples, the driving events include one or more of decreases in speed, excess speed, and increases in speed.

In one or more illustrative examples, the method further includes using a multi-arm bandit algorithm to explore and exploit driving behaviors indicative of risk, adjusting the risk metrics based on the delayed feedback from the claim data.

In one or more illustrative examples, the method further includes initializing the method to initial risk metrics using data captured from lease vehicles to initially set the risk metrics.

In one or more illustrative examples, the method further includes comparing predicted risk determined by the risk model using the high-fidelity data points to actual risk based on the claim data and updating the risk metrics responsive to the predicted risk being more accurate using the updated risk metrics as compared to using the initial risk metrics.

In one or more illustrative examples, the high-fidelity data points include image data captured by image sensors of the vehicles.

In one or more illustrative examples, the high-fidelity data points include advanced driver assistance system (ADAS) signals determined by one or more controllers of the vehicles.

In one or more illustrative examples, a method for assessing driver risk for UBI includes receiving initial risk metrics at a vehicle from a cloud server, the risk metrics defining indications of driving events that may occur on the vehicle that are indicative of an effect on UBI rates for the vehicle; sending aggregated data points collected from the vehicle to the cloud server for use in determining UBI rates, the aggregated data points including data captured by sensors of the vehicle; sending high-fidelity data points from the vehicle to the cloud server responsive to any of the risk metrics being met, the high-fidelity data points including additional data captured by the sensors of the vehicle; receiving updated risk metrics from the cloud server, the updated risk metrics being determined using a multi-arm bandit approach with delayed feedback based on a risk model and claim data indicative of actual claims made with respect to a plurality of vehicles including the vehicle; and applying the updated risk metrics to the vehicle for subsequent determination of occurrence of driving events and sending of the high-fidelity data points.

In one or more illustrative examples, the high-fidelity data points include image data captured by image sensors of the vehicle.

In one or more illustrative examples, the high-fidelity data points include ADAS signals determined by one or more controllers of the vehicle.

In one or more illustrative examples, the driving events include occurrence of ADAS signals determined by one or more controllers of the vehicle.

In one or more illustrative examples, a system for assessing driver risk for UBI, includes a cloud server including one or more hardware processors and a storage configured to maintain vehicle data, the cloud server configured to: send, to a plurality of vehicles, risk metrics defining indications of driving events that may occur on vehicle that are indicative of an effect on UBI rates for the vehicle; receive, from the plurality of vehicles, aggregated data points collected by the vehicles use in determining UBI rates; receive, from the plurality of vehicles, high-fidelity data points collected by the vehicles responsive to occurrence of the driving events; analyze the high-fidelity data points using a vehicle data service to determine updated risk metrics using a multi-arm bandit approach with delayed feedback based on a risk model and claim data indicative of actual claims made with respect to the plurality of vehicles; and provide the updated risk metrics to the plurality of vehicles to aid in detection of the driving events that affect the UBI rates.

In one or more illustrative examples, the cloud server is further configured to determine the risk metrics based on events indicative of driving behavior, including decreases in speed, excess speed, and increases in speed.

In one or more illustrative examples, the cloud server is further configured to use a multi-arm bandit algorithm to explore and exploit driving behaviors indicative of risk, adjusting the risk metrics based on the delayed feedback from the claim data.

In one or more illustrative examples, the cloud server is further configured to initialize initial risk metrics using data captured from lease vehicles to initially set the risk metrics.

In one or more illustrative examples, the cloud server is further configured to compare predicted risk determined by the risk model using the high-fidelity data points to actual risk based on the claim data and updating the risk metrics responsive to the predicted risk being more accurate using the updated risk metrics as compared to using the initial risk metrics.

In one or more illustrative examples, the high-fidelity data points include image data captured by image sensors of the vehicles.

In one or more illustrative examples, the high-fidelity data points include ADAS signals determined by one or more controllers of the vehicles.

BRIEF DESCRIPTION OF THE DRAWINGS

For a better understanding of the invention and to show how it may be performed, embodiments thereof will now be described, by way of non-limiting example only, with reference to the accompanying drawings, in which.

DETAILED DESCRIPTION

Figure 1:
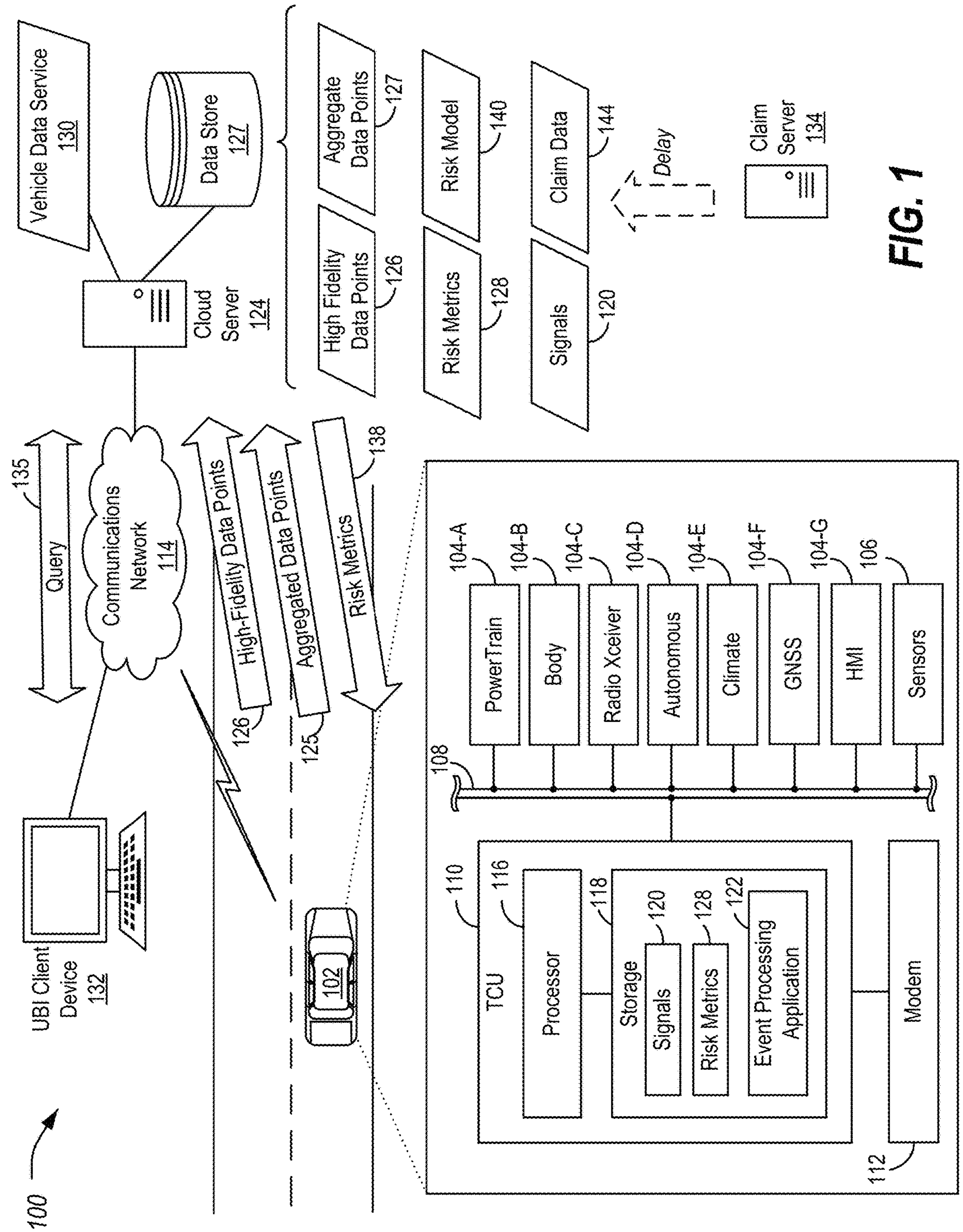
FIG. 1 illustrates an example system for capturing high-fidelity data points to assess driver risk using a multi-arm bandit approach with delayed feedback.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

UBI offers the potential to quote insurance products given varying driver behaviors. UBI quotes are generally based on signals captured by the vehicle. These signals are reflective of operation of the controllers of the vehicle, which accordingly is indicative of the driving behavior of the vehicle. Most of the signals that insurance companies use are primarily based on usage (e.g., miles driven) in combination with other controller signals that are readily available on the vehicle. A simple driver score metric may be defined based on the occurrence of various signal data multiplied by the distance traveled.

Using existing signals in this manner to compute the UBI metric is difficult for many reasons. First, the large amount of vehicle signal data is difficult to transmit and store. Second, aggregation of vehicle data into metrics can provide a poor and/or a noisy result. Third, metrics built for vehicle features other than UBI may be a poor indicator of driving quality, as the signals are designed for other purposes. Fourth, generating new aggregation metrics using human knowledge is difficult to test, poor to scale, and does not capture edge cases well.

Many insurance companies lack high-fidelity data on customer driving behavior, which is essential for developing accurate metrics associated with insurance risk. Although the collection of high-fidelity data from management lease vehicles in original equipment manufacturer (OEM) fleets can lead to the development of improved risk metrics, this data is highly biased. For example, management lease vehicles are unlikely to be driven for ride-share services, unlike those owned by individual customers.

Using UBI risk metrics based on advanced driver assistance systems (ADAS) signals may result in noisy or biased data, leading to poorer performance compared to using low-level signal metrics. Additionally, customers are generally averse to continuous high-fidelity monitoring, and the vehicle and own cloud infrastructure may be unable to handle the high data rates and associated costs. Therefore, a smarter method of data collection and signal development is necessary.

In addition to tabular and nested/structured data, there are numerous unstructured data sources, such as image data, that are available to the vehicle. Time series data can also be considered structured or semi-structured. Computer vision perception detection may focus on ADAS applications rather than insurance risk. Yet, it may be desirable to identify metrics within the unstructured data that statistically correlate with insurance risk. Examples include parking accuracy within parking spots, which can expose the risk of side swipes in city environments and parking lots, determining whether a vehicle is parked in a garage or driveway at each key off, and estimating pothole depths.

Aspects of the disclosure generally relate to accurately predicting risk based on driver usage and behavior, allowing insurance companies to charge customers based on their actual risk. This involves efficiently collecting real data from customers to identify risk metrics from raw data, which can then be applied to a risk model to predict risk metrics accurately. The disclosed approach may do so by capturing high-fidelity data points to accurately assess driver risk using a multi-arm bandit approach with delayed feedback. Further aspects of the disclosure are discussed in detail herein.

FIG. 1 illustrates an example system 100 for capturing high-fidelity data points to assess driver risk using a multi-arm bandit approach with delayed feedback. The system 100 includes one or more vehicles 102, where each vehicle 102 includes a plurality of controller 104 and sensors 106. Each vehicle 102 also includes one or more vehicle buses 108 for communication between the controller 104, sensors 106, and a TCU 110. The TCU 110 includes or otherwise has access to a modem 112 configured to facilitate communication over a communication network 114. The TCU 110 may include a processor 116 and a storage 118. The TCU 110 may capture signals 120 and maintain them in the storage 118. The storage 118 may also maintain an event processing application 122 configured to send, to a cloud server 124, high-fidelity data points 126 based on risk metrics 128 received from the cloud server 124. The cloud server 124 may also be configured to execute a vehicle data service 130 that operates on the high-fidelity data points 126 to update the risk metrics 128 using a risk model 140 based on claim data 144 received from a claim server 134. The updates risk metrics 128 may be provided back to the vehicles 102. The information may also be provided to UBI client devices 132, in an example, to facilitate quoting UBI rates for the vehicles 102. It should be noted that the system 100 is only an example, and systems 100 with more, fewer, or different components may be used.

The vehicle 102 may be any various types of automobile, crossover utility vehicle (CUV), sport utility vehicle (SUV), truck, recreational vehicle, boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). Alternatively, the vehicle 102 may be an autonomous vehicle (AV). The level of automation may vary between variant levels of driver assistance technology to a fully automatic, driverless vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs). It should be noted that while automotive vehicles 102 are being used as examples of traffic participants, other types of traffic participants may additionally or alternately be used, such as bicycles, scooters, and pedestrians.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104 (i.e., controllers 104A through 104G). However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104A may be configured to provide control of engine operating components (e.g., idle control components, fuel delivery components, emissions control components, etc.) and for monitoring status of such engine operating components (e.g., status of engine codes); a body controller 104B may be configured to manage various power control functions such as exterior lighting, interior lighting, keyless entry, remote start, and point of access status verification (e.g., closure status of the hood, doors and/or trunk of the vehicle 102); a radio transceiver controller 104C may be configured to communicate with key fobs, mobile devices, or other local vehicle 102 devices; an autonomous controller 104D may be configured to provide commands to control the powertrain, steering, or other aspects of the vehicle 102; a climate control management controller 104E may be configured to provide control of heating and cooling system components (e.g., compressor clutch, blower fan, temperature sensors, etc.); a global navigation satellite system (GNSS) controller 104F may be configured to provide vehicle location information; and a human-machine interface (HMI) controller 104G may be configured to receive user input via various buttons or other controls, as well as provide vehicle status information to a driver, such as fuel level information, engine operating temperature information, and current location of the vehicle 102.

The controllers 104 of the vehicle 102 may make use of various sensors 106 in order to receive information with respect to the surroundings of the vehicle 102. In an example, these sensors 106 may include one or more of cameras (e.g., advanced driver-assistance system (ADAS) cameras), ultrasonic sensors, radar systems, and/or lidar systems.

One or more vehicle buses 108 may include various methods of communication available between the vehicle controllers 104, as well as between the TCU 110 and the vehicle controllers 104. As some non-limiting examples, the vehicle bus 108 may include one or more of a vehicle controller area network (CAN), an Ethernet network, and a media-oriented system transfer (MOST) network.

The TCU 110 may include network hardware configured to facilitate communication between the vehicle controllers 104 and with other devices of the system 100. For example, the TCU 110 may include or otherwise access a modem 112 configured to facilitate communication over a communication network 114. The TCU 110 may, accordingly, be configured to communicate over various protocols, such as with the communication network 114 over a network protocol (such as Uu). The TCU 110 may, additionally, be configured to communicate over a broadcast peer-to-peer protocol (such as PC5), to facilitate cellular vehicle-to-everything (C-V2X) communications with devices such as other vehicles 102. It should be noted that these protocols are merely examples, and different peer-to-peer and/or cellular technologies may be used.

The TCU 110 may include various types of computing apparatus in support of performance of the functions of the TCU 110 described herein. In an example, the TCU 110 may include one or more processors 116 configured to execute computer instructions, and a storage 118 medium on which the computer-executable instructions and/or data may be maintained. A computer-readable storage medium (also referred to as a processor-readable medium or storage 118) includes any non-transitory (e.g., tangible) medium that participates in providing data (e.g., instructions) that may be read by a computer (e.g., by the processor(s) 116). In general, the processor 116 receives instructions and/or data, e.g., from the storage 118, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, etc.

The TCU 110 may be configured to include one or more interfaces from which information of the vehicle 102 may be sent and received. This information can be sensed, recorded, and sent to one or more cloud servers 124. In an example, similar to the TCU 110, the cloud server 124 may also include one or more processors (not shown) configured to execute computer instructions, and a storage medium (not shown) on which the computer-executable instructions and/or data may be maintained.

The TCU 110 may be configured to facilitate the collection of vehicle signals 120 from the vehicle controllers 104 connected to the one or more vehicle buses 108. These may include, for example, ADAS signals generated by ADAS functions of the vehicle 102. While only a single vehicle bus 108 is illustrated, it should be noted that in many examples, multiple vehicle buses 108 are included, usually with a subset of the controllers 104 connected to each vehicle bus 108. Accordingly, to access a given controller 104, the TCU 110 may be configured to maintain a mapping of which vehicle buses 108 are connected to which controllers 104, and to access the corresponding vehicle bus 108 for a controller 104 when communication with that particular controller 104 is desired.

As used herein, vehicle signals 120 (e.g., ADAS signals and the like) may refer to various binary, multi-state, integer, float, and/or continuous parameters that may be generated or otherwise raised by the vehicle controller 104 and/or sensors 106. As some non-limiting examples, the vehicle signals 120 may include one or more of: latitude, longitude, time, heading angle, speed, throttle position, brake status, steering angle, headlight status, wiper status, external temperature, turn signal status, ambient temperature or other weather conditions, alertness status, hands-off-wheel status, all-wheel drive (AWD) engaged status, front object detection, side object detection status, rear object detection status, etc.

The amount of vehicle signals 120 present on the vehicle 102 may be large and difficult to transmit and store. Thus, the TCU 110 may maintain aggregation functions that create aggregated signals 125 based on a weighted collection of the vehicle signals 120. These aggregated signals 125 may be transmitted from the vehicle 102 to the cloud server 124. The aggregated signals 125 may include a subset of the individual signals 120 retrieved from the controllers 104 and/or the sensors 106 over the vehicle buses 108, weighted according to the aggregation function. In some cases, the aggregated signals 125 may further include contextual information, such as the current time, an identifier of the driver, location information from the GNSS controller 104F that may be used to augment the captured event information with locations of where the vehicle 102 was when the events occurred, etc.

The TCU 110 may also be configured to send high-fidelity data points 126 captured from the sensor 106 to the cloud server 124 during specific situations. The TCU 110 may be configured to transmit the high-fidelity data points 126 over the communication network 114 for reception by the cloud server 124. In an example, the management of sending high-fidelity data points 126 may be handled by an event processing application 122 executed by the TCU 110. In an example, the high-fidelity data points 126 may be sent to the cloud server 124 when triggered to do so by the event processing application 122 of the vehicle 102.

The collection of the high-fidelity data points 126 may be performed in such an event-based manner, in which the vehicles 102 send the high-fidelity data points 126 to the cloud server 124 responsive to satisfaction of one or more risk metrics 128. The risk metrics 128 may define driving events that may occur on the vehicle 102 that are indicative of an occurrence that may affect UBI rates for the vehicle 102. The high-fidelity data points 126 may include one or more signals 120 and/or elements of data from the sensors 106 that are to be captured and provided to the cloud server 124 responsive to occurrence of the driving events. In some examples, the aggregation functions for monitoring of signals 120 to generate the aggregates signals 125 and the risk metrics 128 that operate as a data trigger for collecting the high-fidelity data points 126 may be configurable by the cloud server 124, such that updated aggregation function and/or risk metrics 128 may be sent from the cloud server 124 to the TCU 110 for installation to the vehicle 102.

The driving events may include, as some simple examples, decreases in speed, excess speed, and increases in speed. These driving events may be determined based on the signals 120, such as due to the raising of various ADAS signals indicative of occurrence of these driving events. The risk metrics 128 may also include indications of events that are detectable from other sources of data available on the vehicle. For example, image data from the sensors 106 may include features (such as proximity to parking space lines on pavement) that are indicative of an event that may affect UBI rates for the vehicle 102, such as an occurrence of damage to the vehicle 102 when parked to close to a parking space line.

When a condition of a risk metric 128 is satisfied by the vehicle 102 (such as by a sharp impulse in an accelerometer signal), the high-fidelity data points 126 message may be sent from the modem 112 of the vehicle 102 to the cloud server 124. The message may include event information (loss magnitude, indicator type, etc.) as well as the GNSS coordinates at which the event occurred. Alternatively, the high-fidelity data points 126 can also be compiled from continuously sampled data from the vehicle buses 108, e.g., to the storage 506 of the TCU 110, which may allow for batch uploading of high-fidelity data points 126 from the vehicle 102. Following the collection of event information, the high-fidelity data points 126 may be sent to the cloud server 124 via the on-vehicle modem 112 (or in another example, via a cell phone connected to the vehicle 102). The cloud server 124 may be configured to receive the high-fidelity data points 126 and store the high-fidelity data points 126 in a data store 127. This information may be maintained for processing by a vehicle data service 130. As another possibility, the information may be accessible to a third-party company such as an OBD plug in device of an insurance company, provided a commercial agreement with data protection clauses is entered into.

As explained in detail herein, the vehicle data service 130 may be configured to generate updated risk metrics 128, based on an analysis of the high-fidelity data points 126. This may be accomplished based on a risk model 140. The risk model 140 may be used to determine an estimated risk based on the high-fidelity data points 126. This estimated risk may be compared to an actual risk determined from claim data 144 received after the fact (e.g., from a claim server 134). The claim data 144 may be used as ground truth for whether an event did or did not occur during the timeframe of the collection of the high-fidelity data points 126. However, as compared to the high-fidelity data points 126, the claim data 144 may be delayed in reception to the data store 127 of the cloud server 124 (e.g., by 30 days or another reporting period for vehicle 102 incidents).

The system 100 may further include one or more UBI client devices 132 configured to access the cloud server 124 over the communication network 114. Using the services of the vehicle data service 130 of the cloud server 124, one or more UBI client devices 132 may be configured to perform queries 135 of the data store 127 for various information, e.g., for preparation of insurance quotes.

A multi-arm bandit approach is a type of problem in decision theory and machine learning that involves a scenario where a decision-maker has to choose between multiple options (referred to as "arms" in analogy to slot machines) over time to maximize some cumulative reward. Each arm has an unknown reward distribution, and the goal is to balance exploration (trying out different arms to learn their reward distributions) and exploitation (choosing the arm that is currently estimated to provide the highest reward).

The arms refer to each option that can be chosen by the decision-maker. In the context of the system 100, these could be different driving events or behaviors being monitored. The rewards are the outcomes or payoffs resulting from choosing an arm. In the context of the system 100, this may refer to the actual risk or cost of a claim, which is only known after a delay.

Delayed feedback in the context of a multi-arm bandit problem means that the reward or outcome of selecting an arm is not immediately known. Instead, there is a delay between the time an arm is selected and the time the reward is observed. This can complicate the decision-making process, as the algorithm must continue to make choices without having immediate feedback on its past actions.

The vehicle data service 130 may be configured to determine which driving behaviors are most indicative of future claims. The vehicle data service 130 may accordingly use the MAB approach with delayed feedback to decide which behaviors to monitor closely. In the MAB approach, each time a driving event (like decreases in speed, excess speed, and increases in speed) occurs, it is treated as pulling an arm of a bandit. The immediate outcome (e.g., whether the driver was involved in an accident) is not known right away, as it may take days or weeks for the claim data 144 to come in, hence the delayed feedback. In another example, the driving events may be treated as immediate rewards directly, without waiting for the outcome data to arrive later, and then reevaluated once the claim data 144 arrives.

The cloud server 124 may keep track of the different events and update its understanding of which behaviors are most risky based on the delayed claim data 144. Initially, the vehicle data service 130 of the cloud server 124 may monitor a wide range of behaviors (exploration) to gather data. Over time, as the vehicle data service 130 of the cloud server 124 learns which behaviors are more predictive of claims, the vehicle data service 130 may focus more on those (exploitation), refining its risk predictions and improving the accuracy of its insurance pricing. In some examples, at least a minimum exploration budget may be maintained regardless of the level of accuracy.

Figure 2:
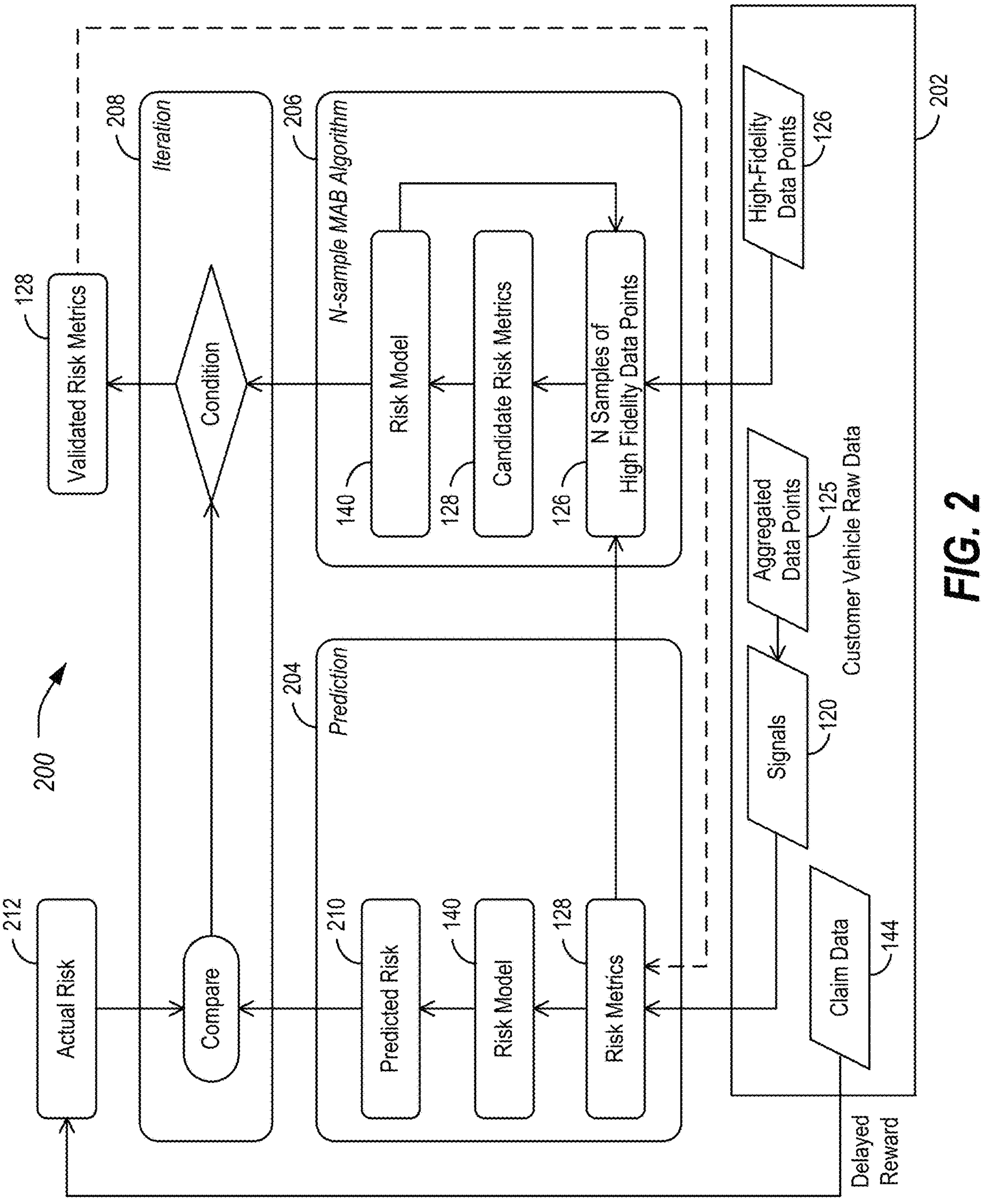
FIG. 2 illustrates an example process for capturing the high-fidelity data points for accurately capturing driver risk, using multi-arm bandit approach with delayed feedback.

FIG. 2 illustrates an example data flow 200 used by the vehicle data service 130 to perform the multi-arm bandit approach to updating the risk metrics 128. As shown, the data flow 200 includes a data archive 202 of customer vehicle raw data, a prediction phase 204, an N-sample multi-arm bandit (MAB) algorithm 206, and an update phase 208.

The data archive 202 include a data lake of various signals 120 retrieved from various vehicles 102, generally in the form of aggregated data points 125. The data archive 202 may also include an amount of high-fidelity data points 126 and claim data 144, e.g. insurance claims and connected vehicle data from various vehicles 102.

The prediction phase 204 includes applying the risk metrics 128 to a risk model 140 to determine a predicted risk 210. The risk model 140 is designed to determine the predicted risk 210 based on the customer vehicle data archive 202 over time. The risk model 140 is trained on the high-fidelity data points 126 obtained from the vehicles 102, using the claim data 144 as ground truth for eventual claims. The risk model 140 may take various forms such as a random forest, xgboost, etc. This predicted risk 210 indicates whether a risk event is likely to occur, based on the signals 120 maintained in the data archive 202.

The N-sample MAB algorithm 206 includes determining new candidate risk metrics 128 based on N samples of the high-fidelity data points 126 captured from the data archive 202. The high-fidelity data points 126 may include data received from the vehicle 102 over time upon satisfaction of the risk metrics 128 indicating that high-fidelity data points 126 should be captured by the vehicle 102 as the vehicle 102 is likely to encounter risk. The candidate risk metrics 128 may also be used by the N-sample MAB algorithm 206 to retrain and improve the risk model 140.

The update phase 208 includes receiving the predicted risk 210 from the prediction phase 204, receiving the actual risk 212 from the claim data 144 (which is typically received after the signals 120 and high-fidelity data points 126 are received). The update phase 208 further includes comparing the predicted risk 210 to the actual risk 212, such that if the predicted risk 210 is more accurate, the candidate risk metrics 128 are applied to the vehicles 102 as new risk metrics 128 for determining events. This allows the vehicle data service 130 to find new risk metrics 128 that capture risk well.

Variations on the data flow 200 are possible. For instance, modifications of the disclosed MAB algorithm 206 may be used. Or, other optimization and/or sampling paradigms may be used, such as Thompson Sampling with Risk Aversion, Bayesian Optimization with Risk Constraints, Deep Reinforcement Learning, etc.

Figure 3:
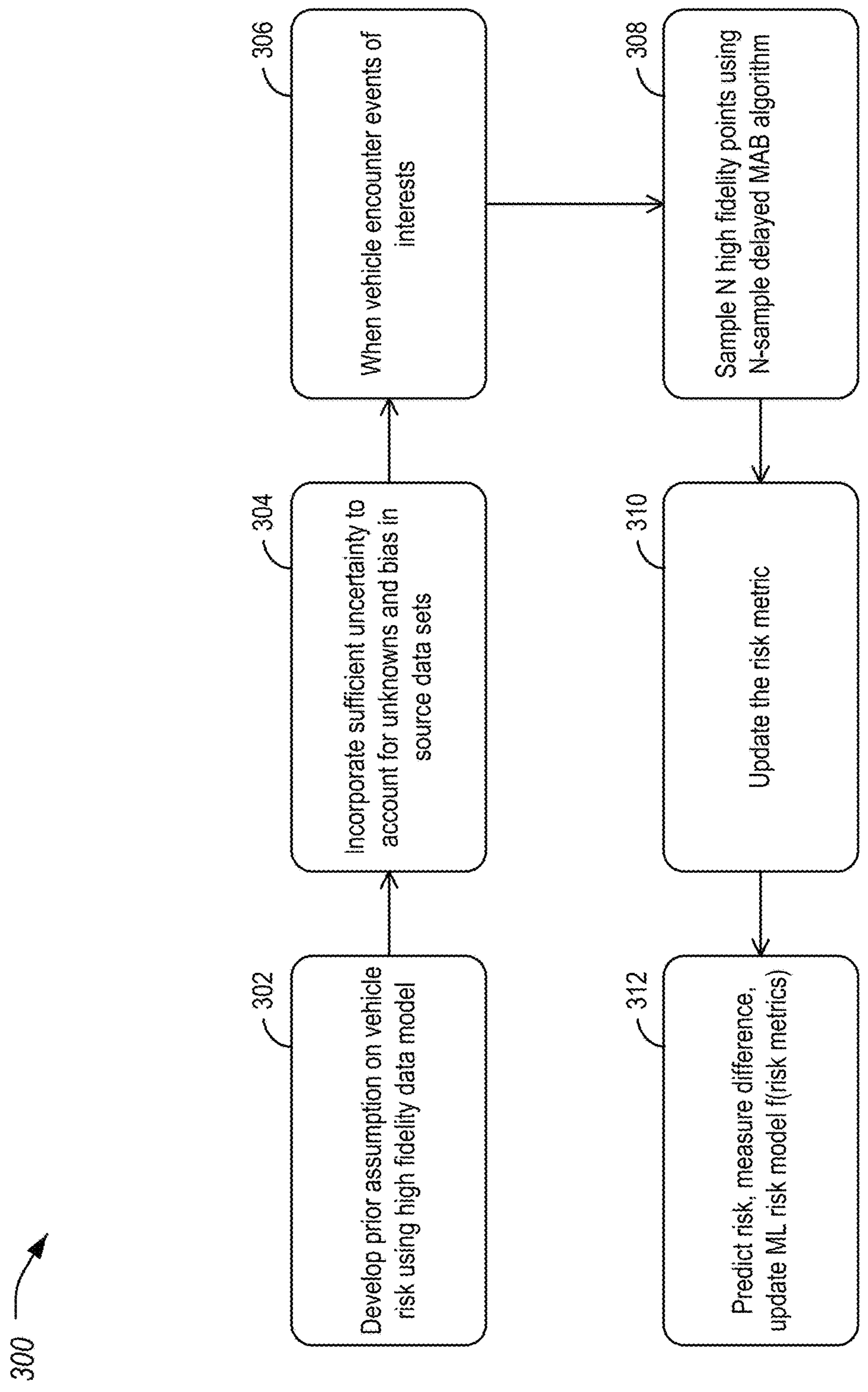
FIG. 3 illustrates an example data flow used by the vehicle data service to perform aspects of the process of FIG. 2.

FIG. 3 illustrates an example process 300 for utilizing the high-fidelity data points 126 for accurately capturing driver risk, using multi-arm bandit approach with delayed feedback. In an example, aspects of the process 300 may be performed by the cloud server 124 in communication with the other elements of the system 100.

At operation 302, a risk metric 128 is identified by the vehicle data service 130 of the cloud server 124 based on historical data. This is performed without considering the driver's specific driving behavior. This might provide biased estimate for risk (reduces risk metric 128 space needed to sample from). As shown in the data flow 200, the high-fidelity data points 126 in the data archive 202 may be used to generate initial risk metrics 128. In an example, the risk metric 128 may include, based on occurrence of one or more events in the high-fidelity data points 126, an estimated time to occurrence of a claimable event for the vehicle 102 in the claim data 144.

In this initial step, it should be noted that ADAS perception signals 120 are used from the data archive 202, which may result in a biased initial input. Yet, unstructured data sources beyond the signals 120, such as image data from vehicle cameras that is captured by the vehicle 102 may be used to overcome this bias in the original data archive 202. Computer vision perception detection may focus on ADAS applications rather than insurance risk. However, it may be desirable to identify risk metrics 128 within this unstructured data that statistically correlates with insurance risk. Examples include parking accuracy within parking spots, which can expose the risk of side swipes in city environments and parking lots, determining whether a vehicle is parked in a garage or driveway at each key off, and estimating pothole depths.

At operation 304, the vehicle data service 130 of the cloud server 124 incorporates uncertainly into the risk metric 128. This may be done to account for unknowns and bias in the source data set. By adding risk to account for unknowns involves introducing a margin of error or a confidence interval around the risk estimates. This can be achieved by analyzing the variability and reliability of the historical data, and then applying statistical techniques to quantify the uncertainty. Bias in the source data can stem from various factors such as underreporting of minor incidents, overrepresentation of certain types of claims, or differences in driving conditions that were not captured in the historical data. By incorporating these uncertainties and biases, the risk metric 128 can be adjusted to better reflect the true risk, considering the potential discrepancies in the data.

In order to capture these risk metrics 128, a machine learning model may be used to generate a latent space encoding of the images. Example risk models 140 may include, for example, the Contrastive Language-Image Pre-training (CLIP) Model, which is trained to learn visual concepts from natural language supervision.

At initialization, the belief and uncertainty of visual metrics may be set to an initial value. For example:

$$\text{metric} = f(\text{latent space in garage @ key off frame}) \sim \text{unknown}$$

At operation 306, responsive to the vehicle 102 encountering an event of interest, the event processing application 122 of the TCU 110 begins collecting the high-fidelity data points 126. These high-fidelity data points 126 are sent from the vehicle 102 to the cloud server 124. After a delay, the claim data 144 is received to cloud server 124 as well. The claim data 144 may indicate the actual risk 212, e.g., due to the occurrence of any indicated claim temporally related to the timeframe of the data capture of the high-fidelity data points 126. It should be noted that the claim data 144 may not be received to the cloud server 124 until after a few days or weeks. During that time, the cloud server 124 may collect the high-fidelity data points 126 from the vehicle 102 to accurately capture the driver's risk pattern.

At operation 308, the cloud server 124 executes the vehicle data service 130 on the collected high-fidelity data points 126. This may include the vehicle data service 130 performing an N-step multi-arm bandit algorithm, where for N−1 steps, the algorithm will not achieve the reward. The reward is the actual risk 212, which will only be known at the Nth step (e.g., after some hours or days as the claim data 144 is received). Based on the analysis, the vehicle data service 130 may utilize probabilities and confidence bounds to calculate an optimal set of signals 120 to use to capture data reflective of the risk of a potential claim.

In the N-sample MAB approach, regions of predicted risk 210 and uncertainty may be searched over the higher dimensional space. When the actual risk 212 is determined in the claim data 144, and the initial risk predictors are identified in the signals 120, risk metrics 128 and risk models 140 using candidate risk metrics 128 can be progressively improved over time. Later, purpose-built algorithms and functions may be built and deployed on the vehicle 102 to avoid computational cost of general/additional risk models 140. For example, the risk model 140 may be replaced with a trained "in garage" image perception model in production rather than the CLIP model.

At operation 310, the vehicle data service 130 of the cloud server 124 compares the risk estimate determined using the original risk metrics 142 to the risk detected using the risk metrics 142 as updated. For example, the cloud server 124 may determine a delta between the risk estimate determined using the original risk metrics 142 to the risk detected using the risk metrics 142 as updated. This comparison may be in view of the actual risk 212 received at operation 306.

At operation 312, if the delta between original estimated and actual risk 212 is beyond a threshold value, the risk metric 128 may be updated. As shown, if the actual risk 212 is more accurately predicted using the candidate risk metrics 128, instead of the current risk metrics 128, then the candidate risk metrics 128 determined at operation 306 are validated into validated risk metrics 128. These validated risk metrics 128 may be applied back to the risk metrics 128 used in the next cycle of risk metrics 128 discovery.

Given the lower dimensional space and computed risk metrics 128 can be quite large to search using connected vehicle approaches, a number of strategies may be employed. First, an initial (albeit potentially) biased data set (e.g. management lease vehicles 102, simulated vehicle data, data from another subset of vehicles 102 to use as a starting point) may be used to set initial belief of risk metrics 128, while accounting for elements of oversampling via increasing uncertainty in regions of the risk model 140 and signals 120 that be thought to be under and over sampled (e.g. geographic features).

Simulated data construction involves generating synthetic data that mimic the characteristics of real-world data but are created through computational models rather than collected from actual vehicles 102. This process may include defining parameters and distributions based on existing data, such as vehicle types, driving patterns, road conditions, weather, and other relevant factors. By adjusting these parameters, data can be simulated defining a wide range of scenarios that the vehicles 102 might encounter. For instance, if the goal is to understand risk metrics associated with certain geographic features, the simulation can introduce variations in road types, traffic conditions, and environmental factors to see how they influence vehicle performance and risk.

Use of simulated data can be valuable in several ways. Firstly, it allows for the exploration of scenarios that might be rare or difficult to observe in real life, thereby providing a broader understanding of potential risks. Secondly, it enables the testing and validation of risk models under controlled conditions, ensuring that the models can generalize well to different situations. Additionally, by incorporating simulated data with real-world data, one can address gaps in the data set, such as underrepresented regions or specific vehicle types, enhancing the robustness of the risk assessment.

In practical applications, simulated data helps set initial beliefs for risk metrics by providing a baseline when real-world data is sparse or incomplete. By starting with this simulated data, the risk model 140 can establish foundational patterns and identify areas with high uncertainty. Over time, as more real-world data is collected, these initial beliefs can be updated and refined, leading to more accurate and reliable risk metrics 128. This iterative process of combining simulated and real-world data ensures that the risk assessment remains adaptive and comprehensive, accounting for a wide range of variables and potential biases.

Moreover, the system 100 may heavily rely on initial signals 120 indicative of risk, such as comfort signals (acceleration), airbag deployment, Insurance app usage, biased data set metrics, etc.

In another example, the system 100 may compare biased data set and global population driving style and data to identify biased or under sampled data (e.g. biased data set may have lower average and std deviation of trips per day compare to global population due to uber drivers), when identified, can be used to set a higher uncertainty.

Figure 4:
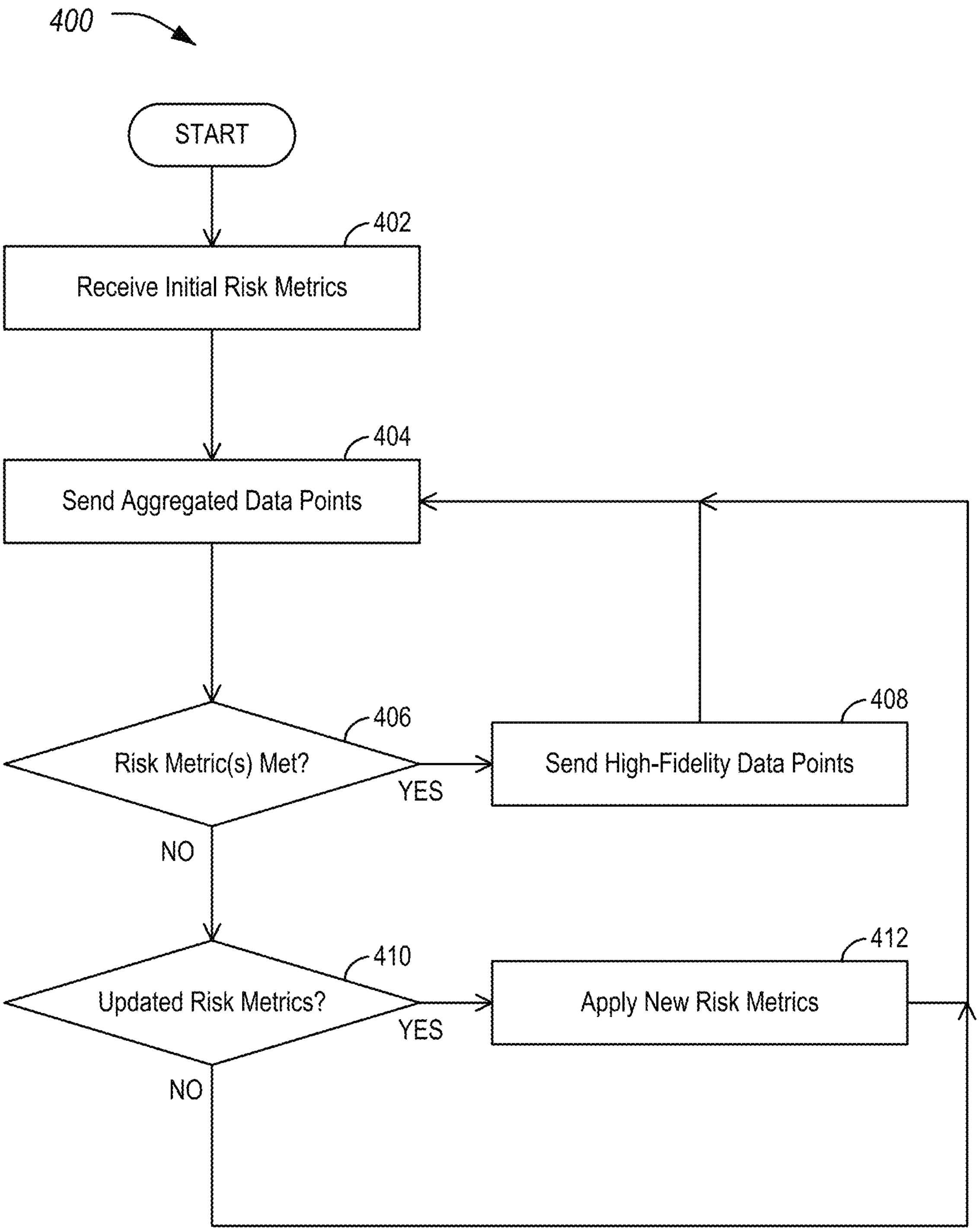
FIG. 4 illustrates an example process for the operation of the vehicle in providing data for UBI, based on the risk metrics determined according to the process of FIG. 3.

FIG. 4 illustrates an example process 400 for the operation of the vehicle 102 in providing data for usage-based insurance (UBI), based on the risk metrics 128 determined according to the process 300.

At operation 402, the vehicle 102 receives initial risk metrics 128. In an example, these risk metrics 128 are received from the vehicle data service 130 of the cloud server 124 based on an initial data set, such as data captured from management lease vehicles 102.

At operation 404, the vehicle 102 sends aggregated data points 125 to the cloud server 124. For example, the TCU 110 may maintain aggregation functions that create aggregated signals 125 based on a weighted collection of the vehicle signals 120. These aggregated signals 125 may be transmitted from the vehicle 102 to the cloud server 124. The aggregated signals 125 may include a subset of the individual signals 120 retrieved from the controllers 104 and/or the sensors 106 over the vehicle buses 108, weighted according to the aggregation function. In some cases, the aggregated signals 125 may further include contextual information, such as the current time, an identifier of the driver, location information from the GNSS controller 104F that may be used to augment the captured event information with locations of where the vehicle 102 was when the events occurred, etc.

At operation 406, the vehicle 102 determines whether any of the risk metrics 128 are met. For instance, if the risk metrics 128 requires signals 120 that have been observed by the vehicle 102, control passes to operation 406. Otherwise, control continues to operation 410.

At operation 408, the vehicle 102 sends high-fidelity data points 126 to the cloud server 124. In an example, the vehicle 102 sends the captured signals 120 and also high-fidelity data points 126 according to the risk metrics 128. These signals 120 may include various structured ADAS signals received to the TCU 110 from the controllers 104 via the vehicle buses 108 of the vehicle 102. The high-fidelity data points 126 may include various unstructured data captured from the sensors 106 of the vehicle 102. After operation 408, control returns to operation 404.

At operation 410, the vehicle 102 determines whether updated risk metrics 128 are available. In an example, the TCU 110 of the vehicle 102 may receive updated risk metrics 128 from the cloud server 124 based on the updating performed using the process 300 by the cloud server 124. If so, control passes to operation 412.

At operation 412, the vehicle 102 applies the new risk metrics 128 for use in sending high-fidelity data points 126 to the cloud server 124. In an example, the new risk metrics 128 are stored to the storage 118 and used for later analysis of the signals 120 to construct high-fidelity data points 126 to send to the cloud server 124. After operation 412, the process 400 returns to operation 404.

Thus, data from vehicles 102 may be sampled to generate novel risk metrics 128 without reliance on a biased test fleet. Moreover, the system 100 may also use high-fidelity data points 126 to incorporate unstructured data as part of novel risk metrics 128 not otherwise predicated based on the ADAS perception features in the signals 120. Yet further, aggregated data points 125 may be utilized for the determination of UBI risk, without sending all the signals 120 from the vehicle 102 to the cloud server 124.

Figure 5:
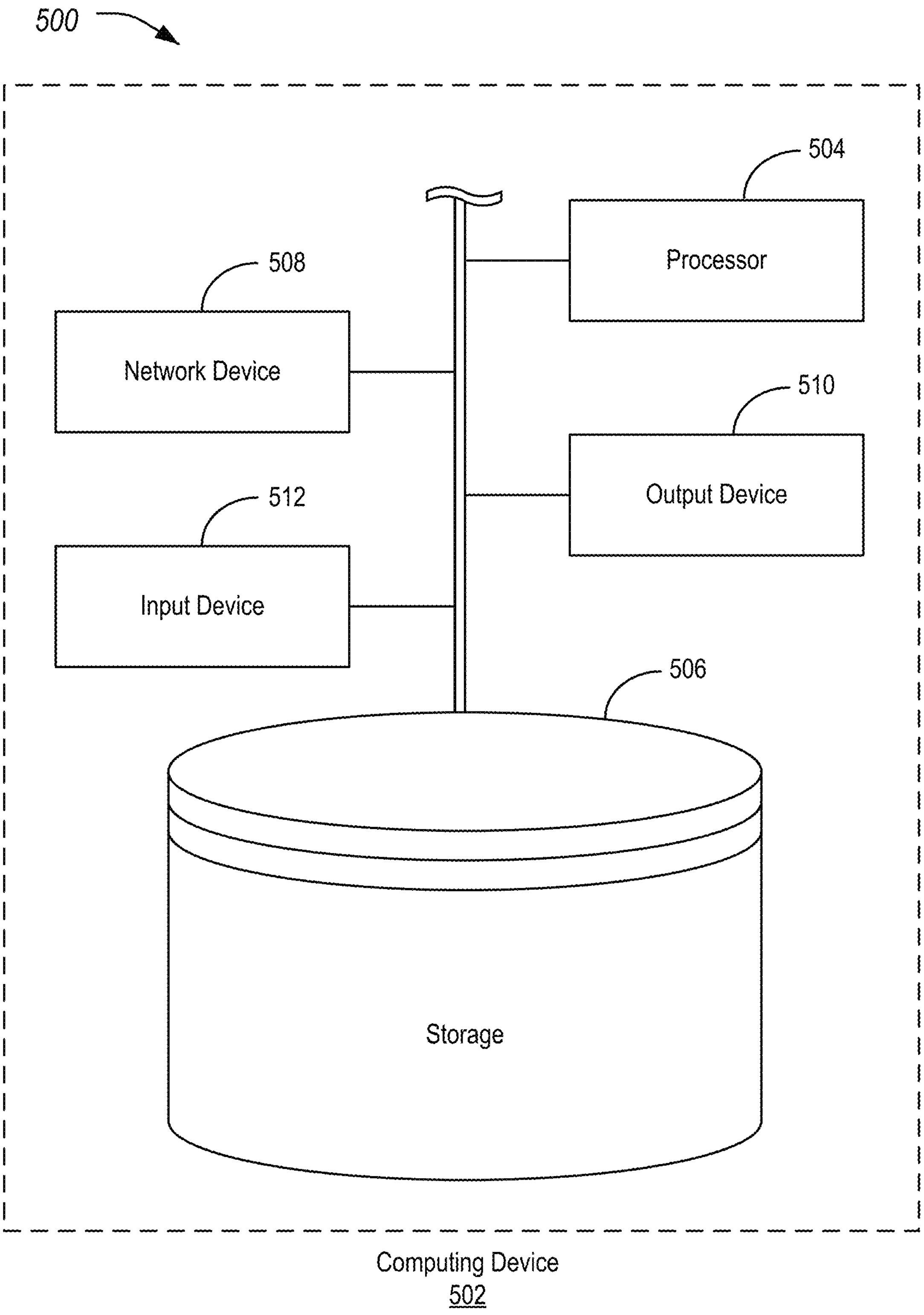
FIG. 5 illustrates an example computing device for capturing high-fidelity data points to assess driver risk using a multi-arm bandit approach with delayed feedback.

FIG. 5 illustrates an example computing device 502 for capturing high-fidelity data points 126 to assess driver risk using a multi-arm bandit approach with delayed feedback. Referring to FIG. 5, and with reference to FIGS. 1-4, the vehicle 102, controllers 104, sensors 106, TCU 110, cloud server 124, and claim server 134 may be examples of such computing devices 502. Computing devices 502 generally include computer-executable instructions, where the instructions may be executable by one or more computing devices 502. Computer-executable instructions may be compiled or interpreted from computer programs created using a variety of programming languages and/or technologies, including, without limitation, and either alone or in combination, Java™, C, C++, C#, Visual Basic, JavaScript, Python, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data, such as signals 120, high-fidelity data points 126, risk metrics 128, risk model 140, claim data 144, etc., may be stored and transmitted using a variety of computer-readable media.

As shown, the computing device 502 may include a processor 504 that is operatively connected to a storage 506, a network device 508, an output device 510, and an input device 512. It should be noted that this is merely an example, and computing devices 502 with more, fewer, or different components may be used.

The processor 504 may include one or more integrated circuits that implement the functionality of a central processing unit (CPU) and/or graphics processing unit (GPU). In some examples, the processors 504 are a system on a chip (SoC) that integrates the functionality of the CPU and GPU. The SoC may optionally include other components such as, for example, the storage 506 and the network device 508 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 504 executes stored program instructions that are retrieved from the storage 506. The stored program instructions, accordingly, include software that controls the operation of the processors 504 to perform the operations described herein. The storage 506 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random access memory (RAM) that stores program instructions and data during operation of the system 100.

The GPU may include hardware and software for display of at least two-dimensional (2D) and optionally three-dimensional (3D) graphics to the output device 510. The output device 510 may include a graphical or visual display device, such as an electronic display screen, projector, printer, or any other suitable device that reproduces a graphical display. As another example, the output device 510 may include an audio device, such as a loudspeaker or headphone. As yet a further example, the output device 510 may include a tactile device, such as a mechanically raiseable device that may, in an example, be configured to display braille or another physical output that may be touched to provide information to a user.

The input device 512 may include any of various devices that enable the computing device 502 to receive control input from users. Examples of suitable input devices 512 that receive human interface inputs may include keyboards, mice, trackballs, touchscreens, microphones, graphics tablets, and the like.

The network devices 508 may each include any of various devices that enable the described components to send and/or receive data from external devices over networks. Examples of suitable network devices 508 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as “a,” “the,” “said,” etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for assessing driver risk for usage-based insurance (UBI), comprising:

sending, to a plurality of vehicles from a cloud server, initial risk metrics defining indications of driving events that may occur on the vehicles that are indicative of an effect on UBI rates for the vehicles;

receiving, to the cloud server from the plurality of vehicles, aggregated data points collected by the vehicles for use in determining UBI rates, the aggregated data points including data captured by sensors of the plurality of vehicles;

receiving, to the cloud server from the plurality of vehicles, additional data points collected by the plurality of vehicles responsive to any of the risk metrics being met, the additional data points including additional data captured by the sensors of the plurality of vehicles;

analyzing the additional data points by the cloud server using a vehicle data service to determine updated risk metrics, the updated risk metrics being determined using a multi-arm bandit approach with delayed feedback including:

generating candidate risk metrics based on the additional data points, applying respective candidate risk metrics to a risk model to determine predicted risk, receiving claim data indicative of actual claims made with respect to the plurality of vehicles as the delayed feedback and determining actual risk based on the claim data, comparing the predicted risk to the actual risk to evaluate the respective candidate risk metrics, and applying, as the updated risk metrics, the candidate risk metrics responsive to the predicted risk determined using the candidate risk metrics being more accurate than predicted risk determined using the initial risk metrics; and providing the updated risk metrics to the plurality of vehicles to be applied to the plurality of vehicles for subsequent determination of occurrence of driving events and sending of the additional data points.

2. The method of claim 1, wherein the driving events include one or more of decreases in speed, excess speed, and increases in speed.

3. The method of claim 1, further comprising using the multi-arm bandit algorithm to explore and exploit driving behaviors indicative of risk, adjusting the risk metrics based on the delayed feedback from the claim data.

4. The method of claim 1, further comprising initializing the method to initial risk metrics using data captured from lease vehicles to initially set the risk metrics.

5. The method of claim 4, further comprising comparing predicted risk determined by the risk model using the additional data points to actual risk based on the claim data and updating the risk metrics responsive to the predicted risk being more accurate using the updated risk metrics as compared to using the initial risk metrics.

6. The method of claim 1, wherein the additional data points include image data captured by image sensors of the vehicles.

7. The method of claim 1, wherein the additional data points include advanced driver assistance system (ADAS) signals determined by one or more controllers of the vehicles.

8. A method for assessing driver risk for UBI, comprising:

receiving initial risk metrics at a vehicle from a cloud server, the risk metrics defining indications of driving events that may occur on the vehicle that are indicative of an effect on UBI rates for the vehicle;

sending aggregated data points collected from the vehicle to the cloud server for use in determining UBI rates, the aggregated data points including data captured by sensors of the vehicle;

sending additional data points from the vehicle to the cloud server responsive to any of the risk metrics being met, the additional data points including additional data captured by the sensors of the vehicle;

receiving updated risk metrics from the cloud server, the updated risk metrics being determined using the additional data points and a multi-arm bandit approach with delayed feedback including:

generating candidate risk metrics based on the additional data points, applying respective candidate risk metrics to a risk model to determine predicted risk, receiving claim data indicative of actual claims made with respect to the vehicle as the delayed feedback and determining actual risk based on the claim data, comparing the predicted risk to the actual risk to evaluate the respective candidate risk metrics, and determining, as the updated risk metrics, the candidate risk metrics responsive to the predicted risk determined using the candidate risk metrics being more accurate than predicted risk determined using the initial risk metrics; and applying the updated risk metrics to the vehicle for subsequent determination of occurrence of driving events and sending of the additional data points.

9. The method of claim 8, wherein the additional data points include one or more of:

image data captured by image sensors of the vehicle; or

ADAS signals determined by one or more controllers of the vehicle.

10. The method of claim 8, wherein the driving events include occurrence of ADAS signals determined by one or more controllers of the vehicle.

11. A system for assessing driver risk for UBI, comprising:

a cloud server including one or more hardware processors and a storage configured to maintain vehicle data, the cloud server configured to:

send, to a plurality of vehicles, initial risk metrics defining indications of driving events that may occur on vehicle that are indicative of an effect on UBI rates for the vehicle;

receive, from the plurality of vehicles, aggregated data points collected by the vehicles for use in determining UBI rates, the aggregated data points including data captured by sensors of the plurality of vehicles;

receive, from the plurality of vehicles, additional data points collected by the plurality of vehicles responsive to any of the risk metrics being met, the additional data points including additional data captured by the sensors of the plurality of vehicles;

analyze the additional data points using a vehicle data service to determine updated risk metrics, the updated risk metrics being determined using a multi-arm bandit approach with delayed feedback including:

generating candidate risk metrics based on the additional data points, applying respective candidate risk metrics to a risk model to determine predicted risk, receiving claim data indicative of actual claims made with respect to the plurality of vehicles as the delayed feedback and determining actual risk based on the claim data, comparing the predicted risk to the actual risk to evaluate the respective candidate risk metrics, and applying, as the updated risk metrics, the candidate risk metrics responsive to the predicted risk determined using the candidate risk metrics being more accurate than predicted risk determined using the initial risk metrics; and provide the updated risk metrics to the plurality of vehicles to be applied to the plurality of vehicles for subsequent determination of occurrence of driving events and sending of the additional data points.

12. The system of claim 11, wherein the cloud server is further configured to determine the risk metrics based on events indicative of driving behavior, including decreases in speed, excess speed, and increases in speed.

13. The system of claim 11, wherein the cloud server is further configured to use a multi-arm bandit algorithm to explore and exploit driving behaviors indicative of risk, adjusting the risk metrics based on the delayed feedback from the claim data.

14. The system of claim 11, wherein the cloud server is further configured to initialize initial risk metrics using data captured from a test set of data to initially set the initial risk metrics.

15. The system of claim 14, wherein the test set of data includes data from a fleet of lease vehicles.

16. The system of claim 14, wherein the test set of data includes simulated vehicle data.

17. The system of claim 11, wherein the additional data points include one or more of:

image data captured by image sensors of the vehicles; or

ADAS signals determined by one or more controllers of the vehicles.

* * * * *